United States Patent [19]

Nakazawa et al.

[11] Patent Number: 4,576,879
[45] Date of Patent: Mar. 18, 1986

[54] SEALED LEAD ACID BATTERY

[75] Inventors: Masao Nakazawa, Takatsuki; Michio Yashima, Kawagoe; Shuuji Takahashi, Ooi, all of Japan

[73] Assignee: Honda Giken Kogyo Kabushiki Kaisha, Takatsuki, Japan

[21] Appl. No.: 659,471

[22] Filed: Oct. 10, 1984

[51] Int. Cl.[4] ............................................. H01M 2/12
[52] U.S. Cl. .......................................... 429/86; 429/88
[58] Field of Search ................... 429/48, 54, 55, 176, 429/86, 87, 88, 66, 160

[56] References Cited

U.S. PATENT DOCUMENTS

| | | | |
|---|---|---|---|
| 3,402,077 | 9/1968 | Kida et al. | 429/54 |
| 3,416,969 | 12/1968 | Halsall | 429/160 |
| 3,494,798 | 2/1970 | Teeter et al. | 429/54 |
| 3,537,902 | 11/1970 | Murata | 429/55 |
| 3,802,597 | 4/1974 | Miller | 429/88 |
| 3,941,617 | 3/1976 | Nees | 429/48 |
| 4,002,495 | 1/1977 | Hakarine | 429/87 |
| 4,133,797 | 1/1979 | Tirpak et al. | 429/176 |
| 4,294,895 | 10/1981 | Atkins | 429/54 |
| 4,336,314 | 6/1982 | Yonezu et al. | 429/66 |

Primary Examiner—Donald L. Walton
Attorney, Agent, or Firm—Armstrong, Nikaido, Marmelstein & Kubovcik

[57] ABSTRACT

A sealed lead acid battery being equipped with a venting valve discharging inner gas to an outside of battery in the event that an inner gas pressure in the battery reaches a prescribed value, a valve opening pressure being set to 0.2-0.4 kg/cm$^2$, an enforceable pressure of positive and negative plate groups being set to 35-60 kg/dm$^2$, polypropylene with filler being used for a material of container, and a side wall thickness of the container being set to 2-4 mm.

3 Claims, 15 Drawing Figures

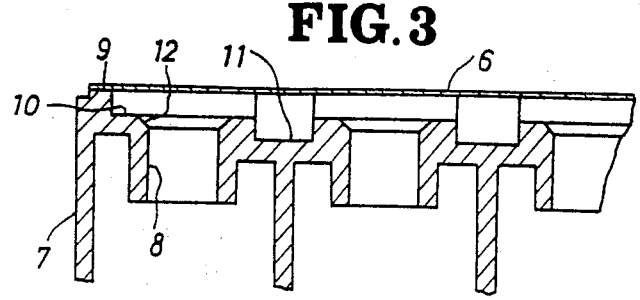
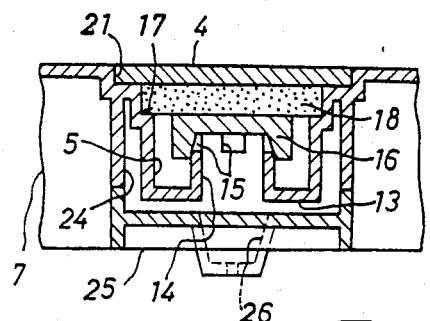
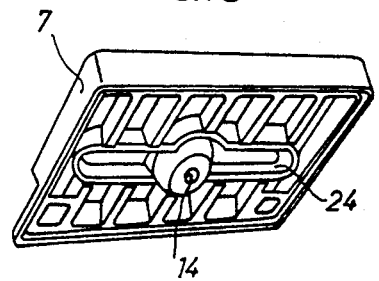
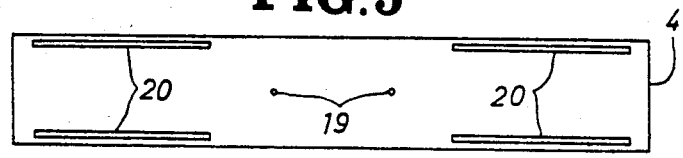
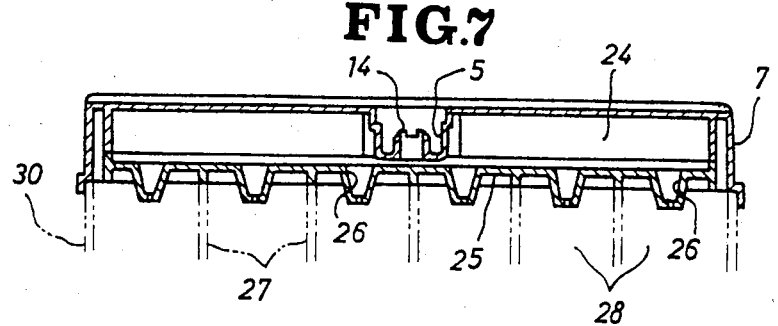

4,576,879

SEALED LEAD ACID BATTERY

FIELD OF THE INVENTION

This invention relates to a sealed lead acid battery equipped with a venting valve which discharges gas to an outside of battery when a pressure in the battery reaches a prescribed value.

DESCRIPTION OF THE INVENTION

In a sealed lead acid battery, a sealed chamber is generally formed of a container opening upwards and a cover covering an upper part of the container, and plural cell chambers divided by partitions are formed in the sealed chamber. An assembled element, in which pluralities of positive and negative plates and separators are superposed upon each other, is inserted in each cell chamber and a valve is provided on said cover.

In said conventional sealed lead acid battery, however, an opening pressure of the valve, an enforceable pressure of positive and negative plate groups inserted in the cell, and a material and a wall thickness of the container are not appropriate; and further, there are disadvantages such as bulging of container during use, deterioration of durability against vibration, and worsening of workability and reliability in fixing the, cover to the container, etc.

SUMMARY OF THE INVENTION

In view of the above disadvantages, an object of this invention is to provide an excellent sealed lead acid battery by preventing the bulging of the container during use, by improving the durability against vibration, and by bettering the workability and reliability in fixing the cover to the container.

In order to accomplish the above object of this invention in a sealed lead acid battery equipped with a venting valve which discharges gas to an outside of battery in the event that a inner gas pressure in the battery reaches a prescribed value, a valve opening pressure is set to 0.2–0.4 kg/cm$^2$, an enforceable pressure of positive and negative plate groups inserted in the cell is set to 35–60 kg/dm$^2$, polypropylene containing filler is used for a material of container, and a side wall thickness of the container is set to 2–4 mm.

BRIEF DESCRIPTION OF THE DRAWINGS

FIG. 3 and FIG. 4 are partial sectional views taken on lines III—III and IV—IV of FIG. 1, respectively.

FIG. 5 is a back-side view of a cover plate.

FIG. 6 is a back-side schematic oblique view of the cover body.

FIG. 7 is a sectional view taken on a line VII—VII of FIG. 2.

DETAILED DESCRIPTION OF THE INVENTION

Figure 1:
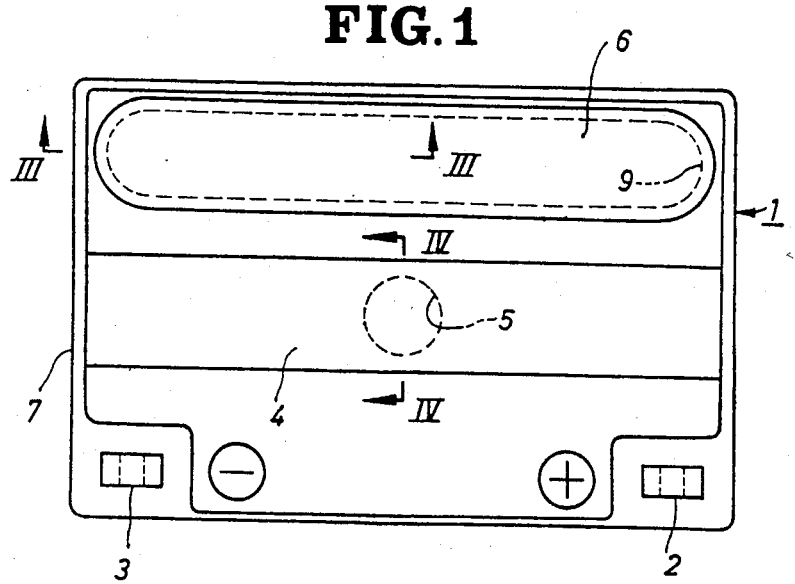
FIG. 1 is a plan view of the battery according to this invention.
Figure 2:
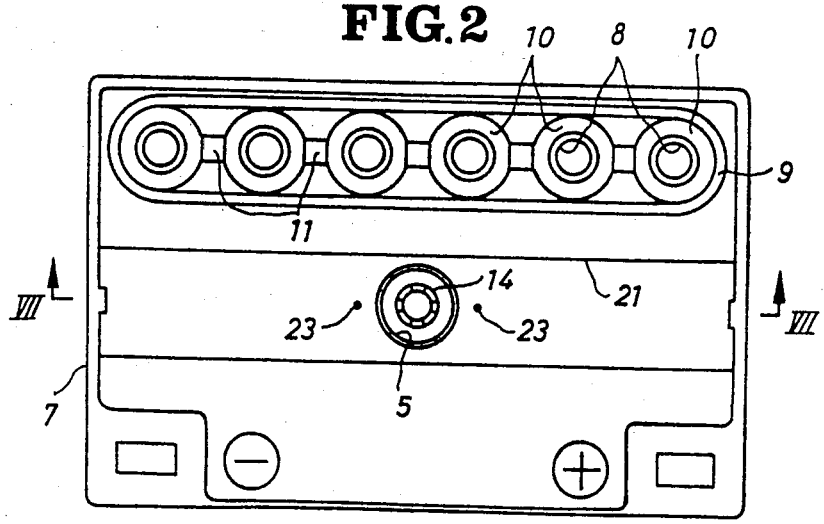
FIG. 2 is a plan view of a cover body.

In FIG. 1, battery terminals 2, 3 project upward at two corners of a cover 1, and an exhaust port 5 covered with a cover plate 4 is provided at a central part of the cover 1. Further, an aluminum foil 6 (an example of a shield) is secured to an upper surface of the cover 1 in the direction parallel to the plate 4. As seen from FIG. 2 showing a cover body 7 from which the cover plate 4 and the foil 6 etc. are removed, a vertical filling port 8 disposed on a straight line is provided on a part covered with the foil 6 (FIG. 1), and a fusion bed 9 to be fused with the elliptical aluminum foil 6 surrounding the filling port 8 projects slightly upward (this side of paper). Each filling port 8 is disposed at a center of a shouldered part 10 having a diameter larger than the port, and each shouldered part 10 is laterally interconnected through a recession 11 respectively.

As shown in FIG. 3 which is a partial sectional view taken on the line III—III of FIG. 1, an upper end of the filling port 8 is connected through a tapered face 12 to the shouldered part 10 and the recession 11 is formed deeper than the shouldered part 10. An upper end face of the fusion bed 9 surrounding each filling port 8 is situated on the same level and formed higher than its surroundings, and the foil 6 is fused and fixed only to the fusion bed 9. The foil 6 consists of an aluminum foil having a bottom face coated with thermoplastic resin, and is airtightly fused to the fusion bed 9 through means of high frequency heating etc.

As shown in FIG. 4, the exhaust port 5 has at its center a cylindrical small diameter portion 14 projecting upward from the bottom plate 13 and a notch 15 evenly disposed in the circumferential direction is provided on an upper end of the small diameter portion 14. A rubber cap 16 fits onto a top of the small diameter portion 14 to elastically close the small diameter portion 14. A disc-shaped filter 18 being a gas permeable material such as a porous ceramic is fitted in and fixed to a shouldered part 17 formed at a vertically central portion of the port 5. When an inner gas pressure of the battery rises, inner gas push opens the rubber cap 16 through the small diameter portion 14 and the notch 15, and passes through the filter 18 to be discharged to an outside of battery. Here, a pressure to open the valve consisting of the rubber cap 16 is set to 0.2–0.4 kg/cm$^2$. The cover plate 4 which covers the port 5 from upper side is a rectangular resin plate as illustrated in FIG. 5, and integrally has at its back-side two central positioning projections 19 and four both-ends legs 20 for being fused with the cover. Therefore, when the plate 4 is fixed to a recession 21 formed on an upper surface of the cover body 7 of FIG. 4 by fusing the leg 20 through means of supersonic wave etc., the plate 4 can be easily disposed in place. Incidentally, 23 of FIG. 2 is a hole in which said positioning projection 19 fits.

As seen from FIG. 6, the back-side of the cover body 7 has an approximately elliptical exhaust passage 24 provided so as to be connected to each cell chamber (described later), and a passage forming member 25 shown in FIG. 7 is arranged at a lower part of the exhaust passage 24. The member 25 has an outer peripheral edge having the same shape as the passage 24, and further has an air hole 26 opening to each cell chamber 28 divided by a partition 27 in a container 30. Namely, the construction is formed into a collective exhaust unit in which gas generated in each cell chamber 28 is collectively exhausted from the exhaust port 5 through the air hole 26 and the passage 24.

Figure 8:
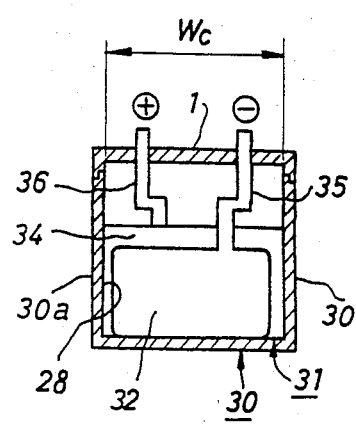
FIG. 8 is a vertical sectional schematic side-view of the battery according to this invention.
Figure 9:
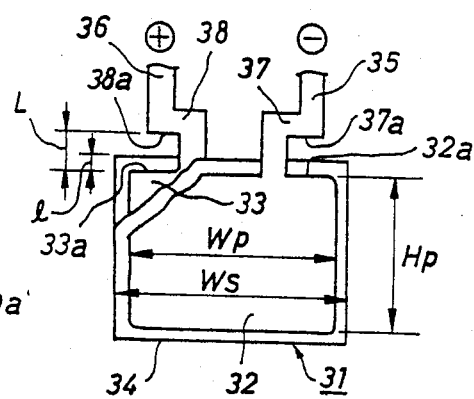
FIG. 9 is a partially fragmental schematic side-view showing a condition before inserting an assembled element.

As illustrated in FIG. 8, the cover 1 fits onto an upper end portion of the container 30 and secured thereto by means of fusion binding. The container 30 is made of polypropylene containing 5–20% of filler (talc) and a thickness of side wall 30a is set to 2–4 mm. An assembled element 31 is inserted in the cell chamber 28 of the container 30 and enforceable pressure of positive and negative plate groups inserted in the cell is set to 35–60 kg/dm$^2$ in this instance. As illustrated in FIG. 9, the assembled element 31 is formed of a rectangular negative plate 32, a rectangular positive plate 33 and a rectangular separator 34 made for example of a microfiber glass mat pluralities of which are supported upon each other. Here, a lateral inner size $W_c$ of the container 30 (FIG. 8), a lateral size $W_p$ of the plates 32, 33 and a lateral size $W_s$ of the separator 34 are related as follows:

$$0.05\ W_p \leq W_c - W_p \leq 0.15\ W_p$$

$$2\ mm \leq W_s - W_c \leq 3\ mm$$

Further, straps 37, 38 are formed integrally with posts 35, 36 at an upper side from each plate 32, 33. A distance L from lower faces 37a, 38a of the straps 37,38 to shoulder's upper end faces 32a, 33a of the plate 32, 33, a height $H_p$ of the plates 32, 33 and an aboveplate exposed height 1 of the separator 34, are related as follows:

$$0.1\ H_p \leq L \leq 0.25\ H_p$$

$$1 < 0.1\ H_p$$

Moreover, porosity of the plates 32, 33 are set to 50% or more satisfying the following relation between a thickness T of the assembled element 31 and a total clearance t between the negative plate 32 and the positive plate 33 occupying the thickness T $$0.15\ T \leq t \leq 0.5\ T$$

Figure 10:
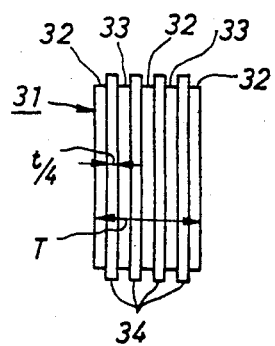
FIG. 10 is a schematic plan view of the assembled element.
Figure 11:
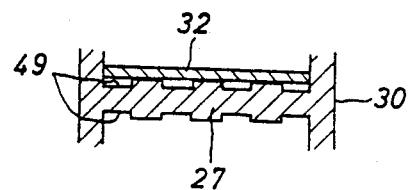
FIG. 11 is a lateral sectional partial schematic plan view of a container.

Considering here the assembled element 31 as shown in FIG. 10 for example, the thickness T and the total clearance t will become as illustrated.

Method to use the battery will be described hereunder. A battery of FIG. 1 is not filled with the electrolyte and the filling port 8 is airtightly closed by means of the aluminum foil 6 as shown by FIG. 3. The exhaust port 5 is closed by closing the small diameter portion 14 with the rubber cap 16. Namely, a battery inside is kept airtight from its outside in the configuration depicted in FIG. 1, thus positive and negative plates 32, 33 in the battery inside are protected against oxidation.

Operation of filling the electrolyte is performed as follows. First of all, the aluminum foil 6 of FIG. 1 is torn off to expose the filling port 8. Then, the electrolyte is filled from the filling port 8 by using a proper electrolyte container. A filling speed of 0.5 to 2.0 cc/sec is preferable because a too high filling speed would cause overflow of the electrolyte from the battery and shortage of battery performance from a prescribed value. A vertical substitution groove 49 may be formed on the partition 27 of the container 30 to accelerate the penetration speed. Further, an amount of electrolyte to be filled is preferably 95–110% of a pore volume of the assembled element 31 in order to absorb gas generated at a time of charging during use in the battery inside.

Figure 13:
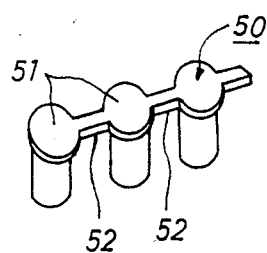
FIG. 12, FIG. 13, and FIG. 14 are partial oblique views of a sealing plug.
Figure 14:
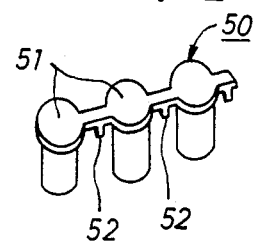
Figure 12:
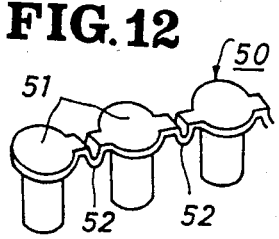
Figure 15:
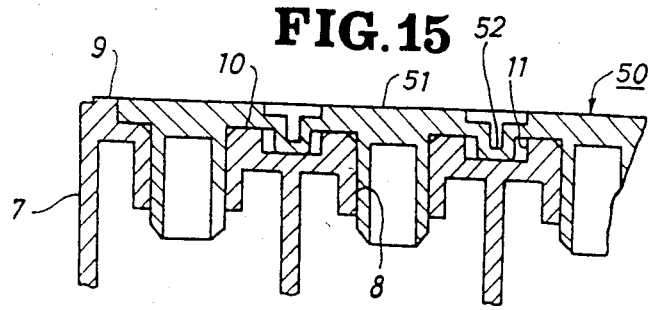
FIG. 15 is a view showing a sealing plug inserted in filling ports as depicted in FIG. 3.

After completion of filling the electrolyte, a sealing plug 50 shown in FIG. 12 is fitted in the filling port 8 to hermetically seal the filling port 8 as shown by FIG. 15. The sealing plug 50 consists of plug bodies 51 of a quantity corresponding to a quantity (six, in this case) of the filling port 8, which are integrally connected to each other with connecting parts 52. Incidentally, FIG. 13 and FIG. 14 illustrate another embodiments of the sealing plug 50.

When gas generated during use causes the inner pressure to rise to exceed a pre-set pressure, the gas passes through the air hole 26, the vent passage 24 and the small diameter portion 14, and push opens the rubber cap 16 to be discharged to the outside. The gas getting out of the rubber cap 16 is discharged through the filter 18.

In manufacturing the battery, the container 30 and the cover 1 are airtightly bonded by means of a heat seal system (method of binding with heated fusion).

As described above, in the sealed lead acid battery according to this invention equipped with the venting valve (for example, the small diameter portion 14, the rubber cap 16 etc.) which discharges gas to the outside of the battery when the pressure in the battery reaches a prescribed value; the pressure to open the valve is set to 0.2–0.4 kg/cm$^2$, the enforceable pressure of the assembled element 31 is set to 35–60 kg/dm$^2$, polypropylene containing filler is used for the material of container, and the side wall thickness 30a of the container is set to 2–4 mm, so that the following effects are achieved:

(a) Prevention of the container 30 from bulging during use:

For example, deformations due to a temperature rise and an increase in inner pressure etc. at the time of charging can be avoided.

(b) Improvement of durability against vibration:

The continer 30 has a sufficient strength, the pressure of the assembled element 31 is high enough and no pressure drop is recognized due to the bulging of the container 30, so that it has a high resistance to vibration.

(c) Since the container 30 has an enough strength and no bulging occurs after insertion of the assembled element, the heat sealing work for securing the container 30 to the cover 1 becomes easy and reliability for airtightness at sealed spots is improved.

(d) The pressure to open the safety valve can be set to a sufficiently high value, that decrease of electrolyte which loss of dissolved gases causes is minimized.

Incidentally, this invention is not limited to application to the dry-charged sealed lead acid battery in which the electrolyte is filled immediately before use, but is also employed samely for a conventional sealed lead acid battery, for instance, in which the electrolyte is previously filled during a manufacturing process and the battery is transported and sold with the electrolyte incorporated therein.

What is claimed is:

1. A sealed lead acid battery comprising:
   (a) a container having a rectangular base, four side walls approximately perpendicular to said base and a plurality of vertical partitions dividing said container into a series of separate chambers, said container being formed from a polypropylene resin containing 5 to 20% inert filler and having a wall thickness of 2 to 4 millimeters;

(b) a plurality of cell elements inserted into said chambers, each cell element consisting of at least one rectangular negative plate and at least one rectangular positive plate, arranged serially, each plate being separated from the next by a rectangular, microfibrous, glass separator, having a length and a width greater than that of said plates, said cell elements being pressed into said chamber so as to have an enforceable positive pressure on said negative and positive plates of between 35 and 60 kg/cm$^2$;

(c) a plurality of straps, connecting the positive and negative plates of each cell respectively;

(d) a cover body sealed to said container, said cover body having a plurality of filler ports, a negative terminal, a positive terminal, and a gas collection system consisting of a common manifold, venting passages connecting said manifold to openings in the top of each of said chambers, a common vent, said vent being formed in a recess in the surface of said cover and comprising a cylindrical, small diameter tube projecting vertically from said common manifold, a plurality of notches formed in the upper portion of said tube, and an elastic cap vertically and horizontally covering said upper tube portion;

(e) a gas permeable filter, fixedly arranged in said vent, superimposed upon and restraining said elastic cap of said common vent; and (f) a loosely fitting cover detachably mounted upon said cover body over said filter, wherein said elastic cap positively seals the upper tube portion, and said elastic cap is arranged with said upper tube portion to release gas through said filter by opening of said elastic cap, by itself, when the gas pressure within the common manifold is between 0.2 to 0.4 kg/cm$^2$ above ambient atmospheric pressure.

2. A sealed lead acid storage battery according to claim 1, wherein said vertical partitions have vertical grooves formed on their surfaces.

3. A sealed lead acid storage battery according to claim 1, wherein the lateral width of the interior of said container (Wc) is related to the lateral width of said positive and negative plates (Wp) and to the lateral width of said operators (Ws) by the following equations:

$$0.05\ Wp \leq Wc - Wp \leq 0.15\ Wp$$

and $$2\ mm \leq Ws - Wc \leq 3\ mm.$$

* * * * *

UNITED STATES PATENT AND TRADEMARK OFFICE
CERTIFICATE OF CORRECTION

PATENT NO. : 4,576,879

DATED : March 18, 1986

INVENTOR(S) : Masao NAKAZAWA et al

It is certified that error appears in the above-identified patent and that said Letters Patent is hereby corrected as shown below:

On the cover page, Item [73], "Honda Giken Kogyo Kabushiki Kaisha, Takatsuki, Japan" should read --Honda Giken Kogyo Kabushiki Kaisha, Tokyo, Japan and Yuasa Battery Co., Ltd., Takatsuki, Japan--.

Signed and Sealed this

Twenty-eighth Day of October, 1986

[SEAL]

*Attest:*

DONALD J. QUIGG

*Attesting Officer*      *Commissioner of Patents and Trademarks*

UNITED STATES PATENT AND TRADEMARK OFFICE
CERTIFICATE OF CORRECTION

PATENT NO. : 4,576,879

DATED : March 18, 1986

INVENTOR(S) : Masao NAKAZAWA et al

It is certified that error appears in the above-identified patent and that said Letters Patent is hereby corrected as shown below:

Claim 1, column 5, line 15, "$kg/cm^2$" should read --$kg/dm^2$--.

Signed and Sealed this

Tenth Day of February, 1987

*Attest:*

DONALD J. QUIGG

*Attesting Officer*     *Commissioner of Patents and Trademarks*